United States Patent [19]

Hudson et al.

[11] 4,039,271
[45] Aug. 2, 1977

[54] CONTOURED ASSIST PLUG FOR THERMOFORMING ORIENTED ARTICLES

[75] Inventors: Jimmie E. Hudson, Bartlesville, Okla.; Calvin D. Dockery, Bacton, England

[73] Assignee: Phillips Petroleum Company, Bartlesville, Okla.

[21] Appl. No.: 678,286

[22] Filed: Apr. 19, 1976

Related U.S. Application Data

[60] Division of Ser. No. 539,041, Jan. 7, 1975, Pat. No. 3,966,860, which is a continuation-in-part of Ser. No. 75,801, Sept. 24, 1969, abandoned.

[51] Int. Cl.² .................................... B29C 17/04
[52] U.S. Cl. .................................... 425/529; 425/412; 425/397; 425/398; 425/469
[58] Field of Search ......... 425/DIG. 216, 412, 387 R, 425/387 B, 388, 397, 398, 457, 469

[56] References Cited

U.S. PATENT DOCUMENTS

| | | | |
|---|---|---|---|
| 2,990,581 | 7/1961 | Rowe, Jr. | 264/89 |
| 3,167,104 | 1/1965 | Wiley et al. | 425/292 |
| 3,173,174 | 3/1965 | Edwards | 425/387 |
| 3,291,874 | 12/1966 | Negoro | 425/398 |
| 3,338,997 | 8/1967 | Tigner | 425/388 |
| 3,342,914 | 9/1967 | Edwards | 425/388 |
| 3,433,862 | 3/1969 | Weber | 425/305 |
| 3,461,503 | 8/1969 | Dockery | 425/292 |
| 3,470,281 | 9/1969 | Knowles | 425/193 |
| 3,499,188 | 3/1970 | Johnson | 425/398 |

*Primary Examiner*—Richard B. Lazarus

[57] ABSTRACT

Oriented articles such as jars and the like having wall sections of exceptional uniformity are thermoformed from sheet by heating the sheet to orientation temperature and stretching it with a plug assist which has a concave surface with a flat face around the periphery thereof terminating in a radius of 1/64 to ¼-inch. This configuration allows a controlled amount of slippage to occur as the plug advances to stretch the sheet.

5 Claims, 5 Drawing Figures

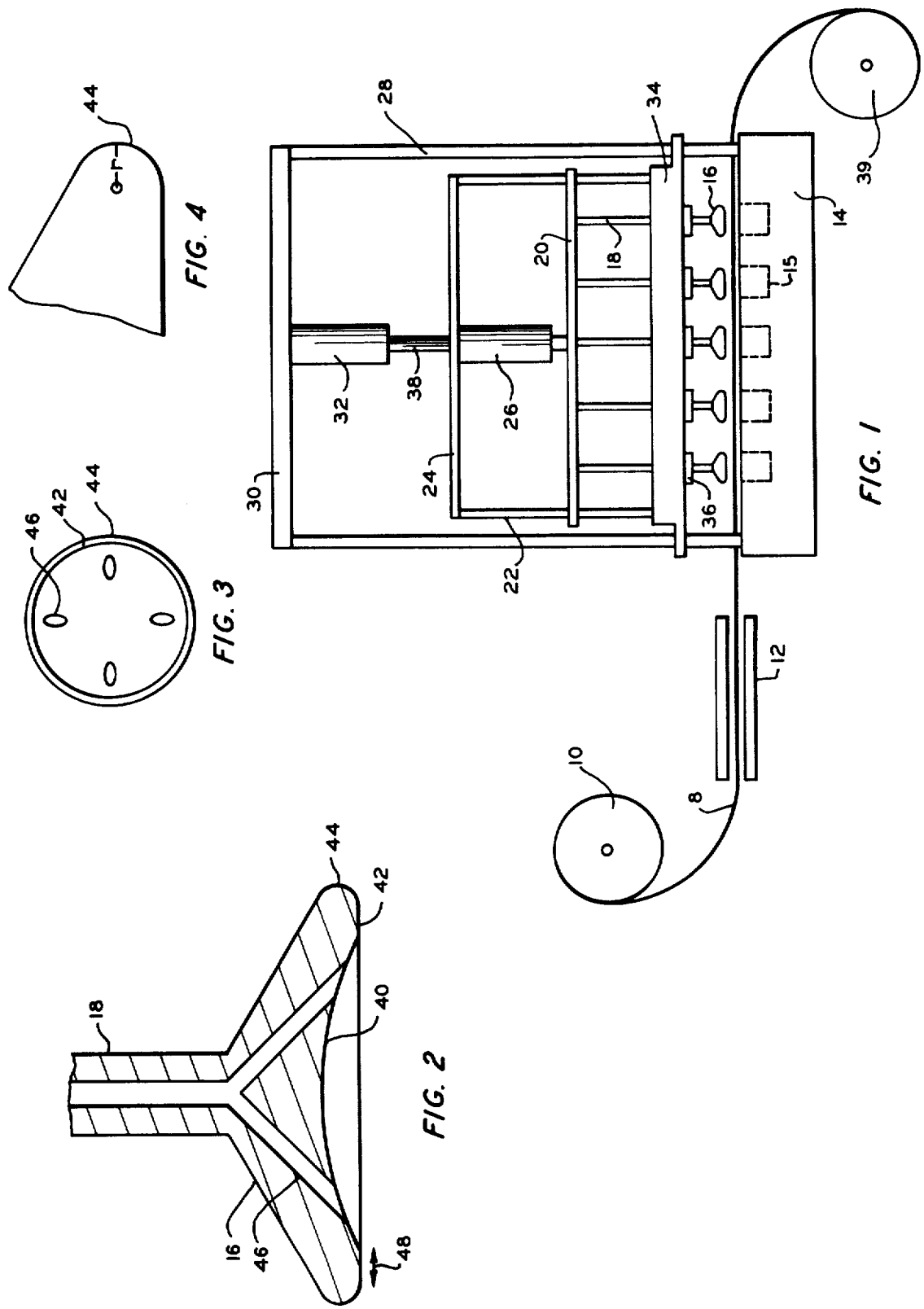

CONTOURED ASSIST PLUG FOR THERMOFORMING ORIENTED ARTICLES

CROSS REFERENCE TO RELATED APPLICATIONS

This is a divisional of copending application Ser. No. 539,041, filed Jan. 7, 1975, now U.S. Pat. No. 3,966,860 which in turn is a C-I-P of copending application Ser. No. 75,801, Sept. 24, 1969, now abandoned.

BACKGROUND OF THE INVENTION

This invention relates to thermoforming open end articles such as jars at orientation temperature.

It is broadly known to form high strength hollow articles such as jars and the like from polymer sheet which has been heated to orientation temperature as is shown by Dockery, U.S. Pat. No. 3,461,503. It is also known in the conventional thermoforming art to achieve greater uniformity of wall thickness by sucking the plastic up against a concave bottom plug face or billowing it out from the plug face as shown, for instance, by Rowe, Jr., U.S. Pat. No. 2,990,581.

However, it has been found that the technology which has grown up around the ordinary thermoforming of molten sheet is not necessarily applicable to thermoforming of sheet at orientation temperature. For instance, molten polyethylenes, when contacted with a plug assist, tend to exhibit no slippage past the periphery of the plug assist. This is why it is necessary in order to achieve thinning of the area under the plug assist to utilize techniques such as are shown in Rowe, Jr. Since the molten plastic under the plug assist is not going to stretch due to slippage, it is necessary to stretch it in some other way, such as by drawing it up into a deep concave surface as is shown in FIG. 3 of Rowe, Jr. However, this identical polymer, when heated to orientation temperature, has a tendency to slip past the periphery of the plug and further is not sufficiently pliable to be easily billowed back and forth; thus, techniques for achieving uniformity which work well in thermoforming molten sheet are not useful in thermoforming at orientation temperature.

SUMMARY OF THE INVENTION

It is an object of this invention to provide oriented jars and the like having essentially uniform wall thickness throughout;

It is a further object of this invention to provide improved apparatus for thermoforming sheet at orientation temperature; and It is yet a further object of this invention to provide controlled slippage past a plug assist as said plug advances.

In accordance with this invention, a thermoplastic sheet is heated to orientation temperature and stretched by a plug assist having a concave forming surface with a flat face around the periphery thereof terminating in a radius of 1/64 to ¼-inch.

BRIEF DESCRIPTION OF THE DRAWINGS

In the drawings, forming a part hereof, wherein like reference characters denote like parts in the various views, FIG. 1 is a schematic representation of a thermoforming operation employing the plug assist of the instant invention;

FIG. 2 is a cross-sectional view through the plug assist of FIG. 1;

FIG. 3 is a bottom view of the plug assist of FIG. 2;

FIG. 4 is an enlarged view of the edge of said plug; and

DESCRIPTION OF THE PREFERRED EMBODIMENTS

Figure 5:
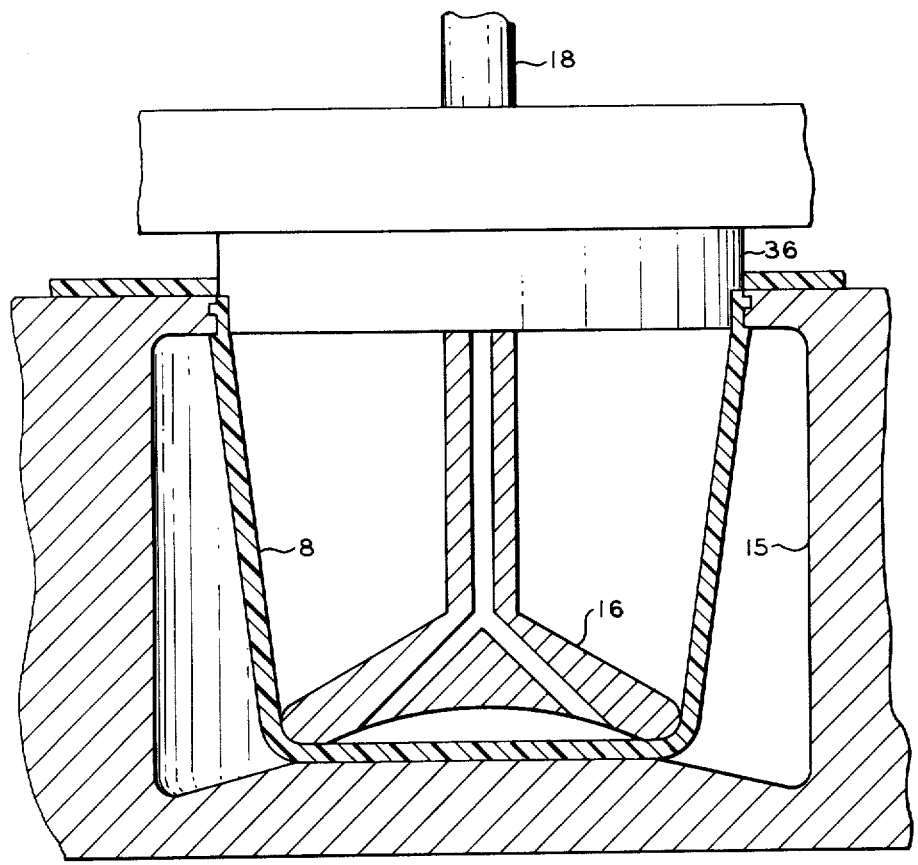
FIG. 5 is a sectional view of the plug in its descended position.

The technique of the instant invention is applicable to thermoforming of any thermoplastic material which can be conditioned to a temperature at which molecular orientation occurs on stretching. Exemplary polymers are polymers of at least one mono-1-olefin having 2-8 carbon atoms per molecule, poly(vinyl chloride), polystyrene and other styrene-containing copolymers such as ABS, and the like, preferably polymers or copolymers of ethylene, propylene or butene.

By orientation temperature is meant the temperature at which strengthening of the polymer results due to molecular or crystalline orientation within the polymer. For crystalline materials, orientation temperature is generally 1°-50°, preferably 2°-25° below the crystalline melting point and for amorphous materials it is about the same amount below the homogeneous melt temperature. The crystalline melt point can be determined by placing a small sample of the material to be tested on a heating stage of a polarizing microscope and recording the crystalline melt point as that temperature at which the last birefringence disappears on slow heating.

The instant invention is of utility in forming any type of hollow article such as the threaded jars shown in the Dockery patent referred to hereinabove.

The plug can be formed from any conventional structural material; however, for best results, the plug should be hardened and chromed. A hardness of 48-50 Rockwell is preferred as greater hardness may result in a plug which is unnecessarily susceptible to cracking.

The annular flat face around the periphery of the plug will have a width of about 1/32 to about ¼, preferably 1/16 to ⅛-inch; the radius at the termination thereof will be about 1/64 to about ¼, preferably 1/32 to ⅛-inch, although the two are interrelated and some variations from these values are possible when molding unusually large or unusually small articles. Further, the width of the flat annular face and the radius of curvature of the periphery thereof can be varied to tailor a plug assist to a particular mold to give almost exactly uniform wall thickness or to intentionally give a thicker section in the bottom or sides. For instance, making the flat face wider and/or the radius larger allows more of the sheet to slip past the plug assist, thus making the bottom thinner and the walls relatively thicker. Conversely decreasing the face width and/or decreasing the peripheral radius increases the drag of the sheet past the periphery of the plug assist and thus holds more material beneath the plug assist, thus making the bottom thicker and the walls relatively thinner. Except for the thread area, the resulting articles (where uniformity is desired) preferably will have no more than ±35%, more preferably no more than ±25% variation from the average wall thickness thereof.

Referring now to the FIGURES, particularly FIG. 1, there is shown a sheet 8 of polypropylene, for example, which is from 0.125 to 0.300-inch thick being passed from roll 10 to heating means 12 wherein the sheet is heated to about 325° F. Sheet 8, now heated to orientation temperature, is then passed over split mold sections 14 having cavities 15 such as are shown in more detail in said Dockery patent referred to hereinabove. Plug assists 16 are carried by rods 18 which are connected to movable frame 20 which is slidably mounted on members 22. Plate 24 carries cylinder 26 which is attached to frame 20 and thus serves as the means to actuate plug assists 16. Upright guide members 28 connect to plate 30 which carries hydraulic cylinder 32. Movable frame 34 carries mandrels 36 and is slidably mounted on upright members 28. Piston rod 38 connects to movable frame 34 through plate 24 and members 22 and controls the vertical motion thereof. This allows separate advancement of plug assists 16 and mandrels 36, as shown in greater detail in said Dockery patent referred to hereinabove, the disclosure of which is hereby incorporated by reference. The sheet is advanced by means of shaft 39.

Referring now to FIGS. 2 and 3, there is shown in cross section plug assist 16 having a concave leading surface 40 with a flat annular face 42 around the periphery thereof terminating in edge 44 having said radius within the range of 1/64 to ¼-inch. Channels 46 are provided in rod 18 and plug assist 16 to provide blow air in this area. The width of face 42 is shown by double arrow 48.

In operation, plug 16 initially contacts sheet 8 only around an annular area corresponding to face 42 concentric with an article forming zone within mold means 14. Thereafter, pressure is applied against said annular area to stretch said sheet. As said plug descends it continues to contact the sheet around said annular area only until it reaches the end of its descent adjacent the bottom of the mold cavity. Material slips from within the area encompassed by said annular area during said descent. This is facilitated by the fact that it is not cooled in this area by contact with the plug but rather is contacted only by the ambient air. The sheet remains at orientation temperature during this stretching operation. The inner diameter of the mold, as shown in FIG. 5, is sufficiently greater than the outer diameter of the plug that the sheet does not contact the sides of the mold during this descent but rather first contacts the sides of the mold on imposition of a fluid pressure differential between the interior of the thus stretched sheet and the space between the sheet and the sides of the mold. Thus, there is a space between the outer periphery of plug 16 and the inner walls of mold cavity 15 greater than the thickness of sheet 8. This is not meant to preclude contact in a neck area where it may in some instances be desirable to form the threads before the stretching is complete. The stretched sheet is caused to conform to the mold zone by differential fluid pressure created by a vacuum pulled through the walls of the mold and/or pressure introduced through channels 46.

FIG. 4 shows in greater detail edge 44 with radius r of, for instance, 1/16-inch.

Many conventional parts, such as temperature controllers, motors, brackets, and the like have been omitted for the sake of simplicity, but their inclusion is understood by those skilled in the art and is within the scope of the invention.

EXAMPLE

Propylene homopolymer having a density of 0.905 (ASTM D 1505-63T), a melt flow of 2 (ASTM D 1238-62T, Condition L), and a crystalline melting point of about 340° F was extruded into flat sheet having a thickness of 3/16 of an inch and allowed to cool to room temperature. The sheet was then reheated by passing through a long heated block which was kept at a temperature of 324°-328° F. The sheet traveled through the block at a rate sufficient to allow a 20 minute heating time during which time the sheet was heated to a temperature between 3° and 5° below the temperature of the heating block. The resulting heated sheet was placed into a vacuum-forming device similar to that shown in the FIGURES and a plug assist such as is shown in the drawings was lowered into contact with the sheet. The plug assist had a concave lower surface and a flat annular face around the periphery thereof, said face having a width of 1/16 of an inch. The face terminated around the periphery thereof with a radius of about ⅛-inch. The plug assist continued to descend, stretching the plastic into the mold cavity with a portion of the sheet beneath the plug assist slipping past the edge thereof during this descent. A mandrel was lowered to force the sheet around the upper rim of the container into conformity with the thread-forming area and blow pressure was introduced via lines in the plug assist cause the plastic to conform to the shape of the mold cavity. The resulting article had a wall thickness just below the shoulder thereof of 0.031-inch; a thickness approximately one-fourth of the way down the side wall of 0.027-inch; a thickness a little past half-way down the side wall of 0.025-inch; a thickness about two-thirds of the way down the side wall at the inward projection of an inward strengthening ridge of 0.027; a thickness near the bottom of said side wall of 0.021; a bottom thickness about a fifth of the way in from the side wall of 0.025-inch; a bottom wall thickness about two-thirds of the way between the side wall and the center of 0.025-inch; and a bottom wall thickness at the center of 0.025-inch. Thus, the 3/16-inch sheet was stretched down to form a bottle having walls approximately 26 mils thick with exceptional uniformity. Because the stretching was done at orientation temperature, the resulting bottle also had exceptional clarity and walls which exhibited high impact strength.

While this invention has been described in detail for the purpose of illustration, it is not to be construed as limited thereby, but is intended to cover all changes and modifications within the spirit and scope thereof.

We claim:

1. Apparatus for forming open end articles comprising in combination:
   sheet heating means operable to heat sheet to orientation temperature;
   mold cavity means;
   means advancing said sheet through said heating means and into position over said mold cavity means;
   a plug assist having a concave leading surface with a flat annular face around the periphery thereof, said face terminating in a peripheral edge having a radius of curvature within the range of 1/64 to ¼-inch, said mold cavity means having an inner diameter greater than the outer diameter of said plug assist such that a space greater than the thickness of said sheet exists between said periphery of said plug and the side walls of said mold cavity;
   means moving said plug so that said flat annular face contacts the thus heated sheet thereby stretching said sheet into said mold cavity whereby said flat annular face controls an amount of slippage of said sheet over said flat annular face; and means creating a pressure differential between two sides of said sheet.

2. Apparatus according to claim 1 wherein said face has a width of 1/32 to ¾-inch.

3. Apparatus according to claim 1 wherein said face has a width of 1/16 to ¼-inch, and said radius is within the range of 1/32 to ⅛-inch.

4. Apparatus according to claim 1 comprising in addition:
 channel means within said plug to convey fluid to the concave leading surface thereof.

5. Apparatus according to claim 1 wherein said plug is made of metal having a hardness of 48–50 Rockwell.

* * * * *